UNITED STATES PATENT OFFICE.

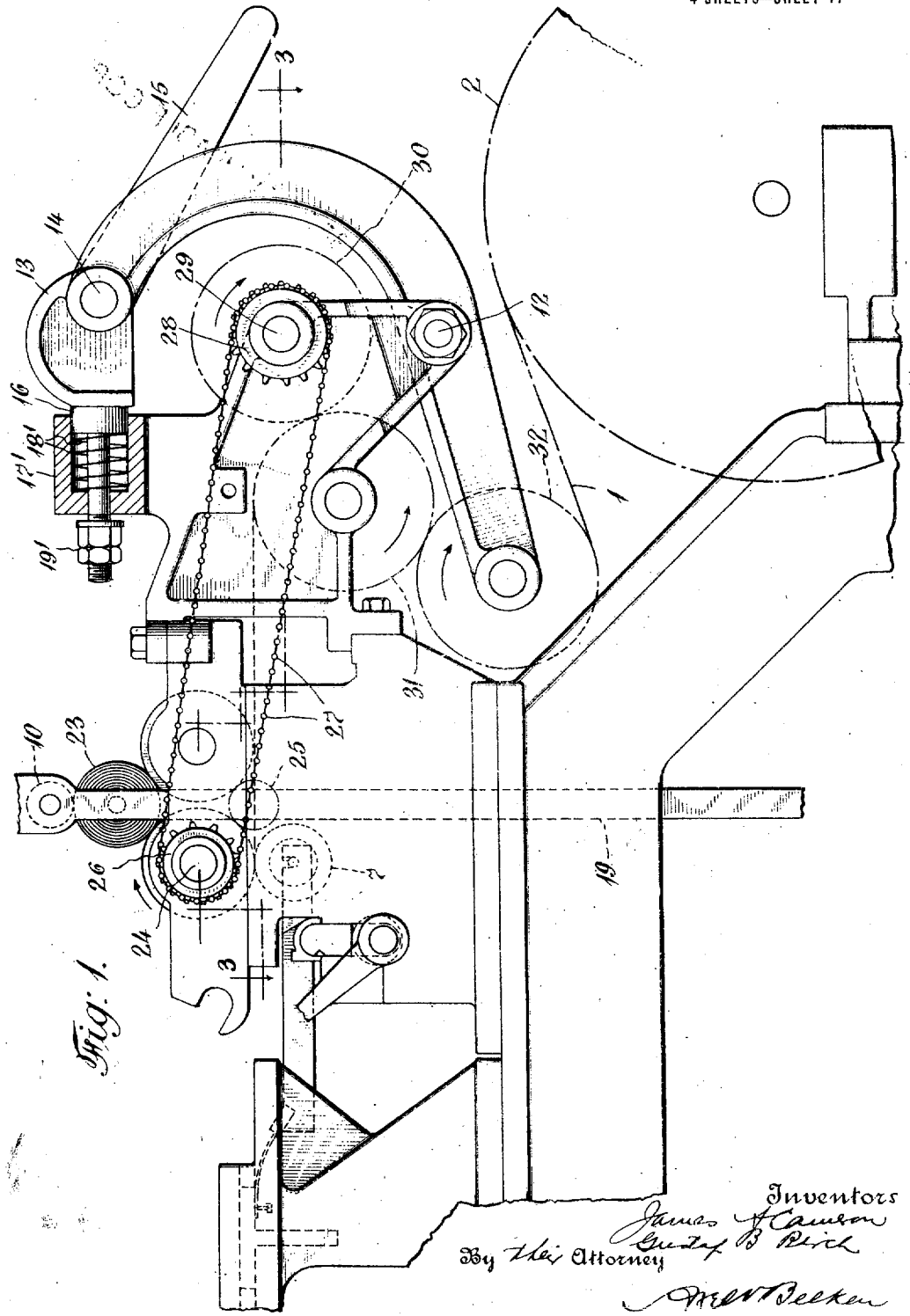

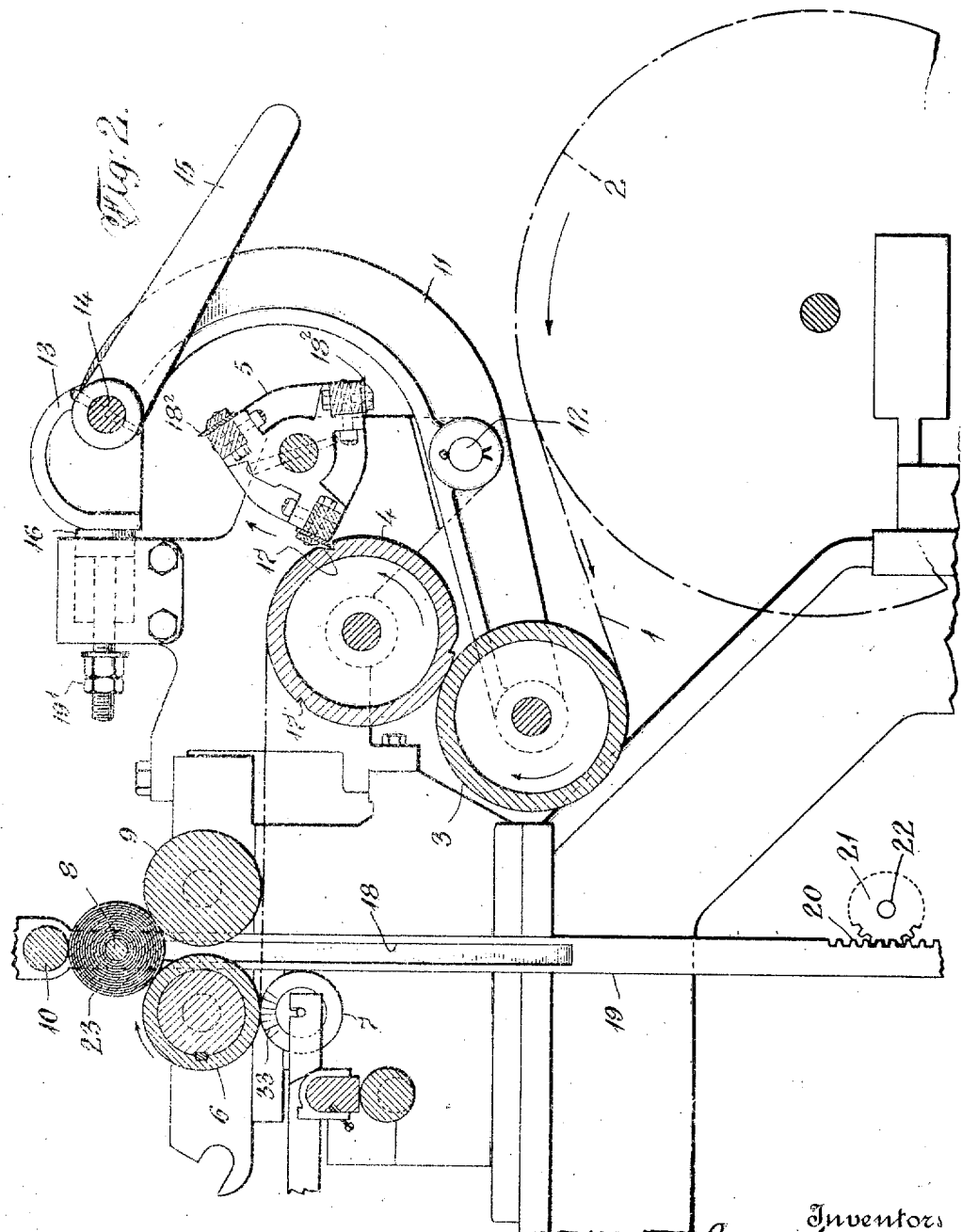

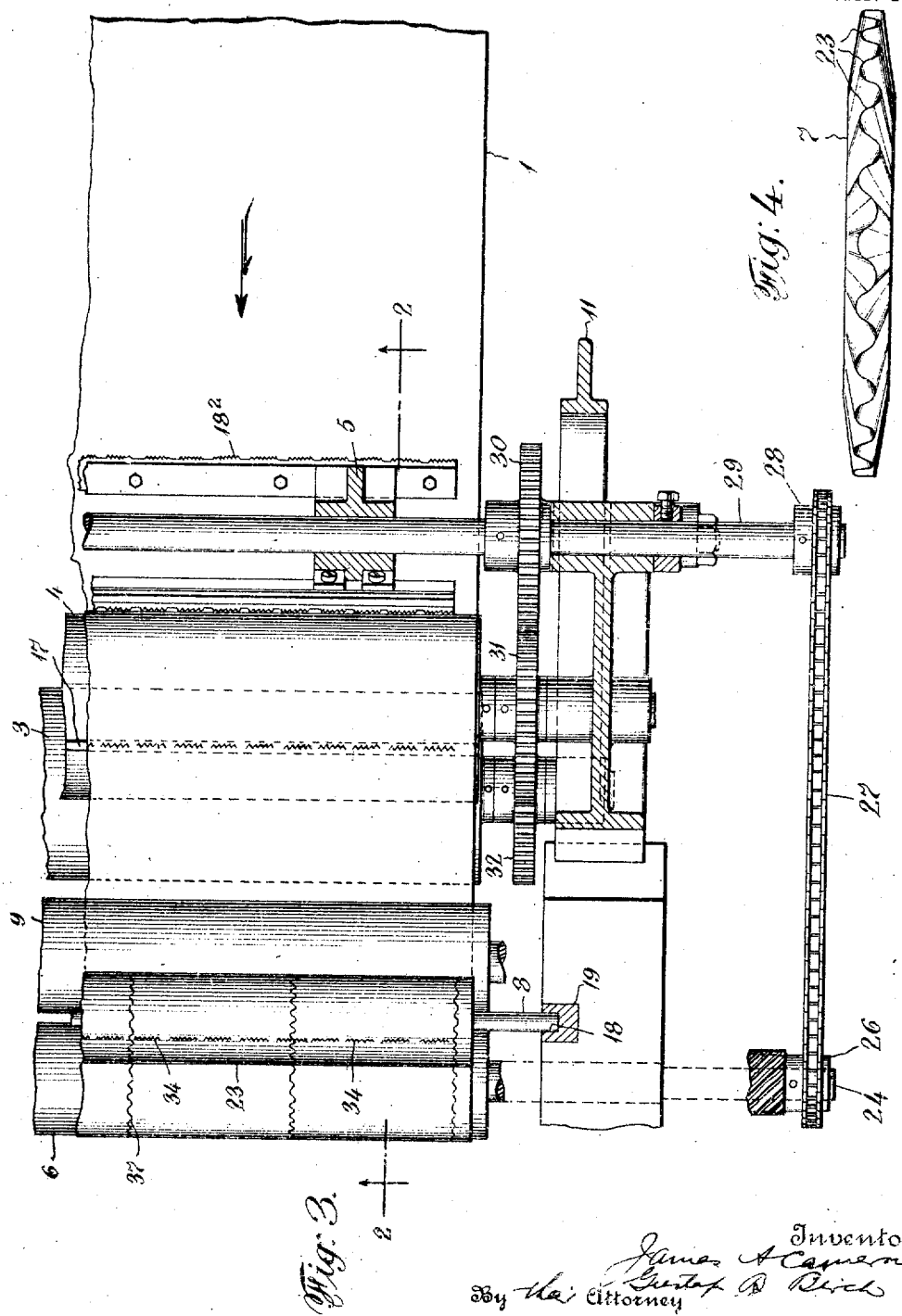

JAMES A. CAMERON AND GUSTAF BIRGER BIRCH, OF BROOKLYN, NEW YORK, ASSIGNORS TO CAMERON MACHINE COMPANY, OF BROOKLYN, NEW YORK, A CORPORATION OF NEW YORK.

PERFORATING, SLITTING, AND REWINDING MACHINE.

1,256,658.      Specification of Letters Patent.      Patented Feb. 19, 1918.

Application filed August 3, 1915. Serial No. 43,370.

*To all whom it may concern:*

Be it known that we, JAMES A. CAMERON and GUSTAF B. BIRCH, citizens of the United States, and residents of the borough of Brooklyn, in the county of Kings, city and State of New York, have invented certain new and useful Improvements in Perforating, Slitting, and Rewinding Machines, of which the following is a specification.

The present invention relates generally to a machine for slitting, perforating and rewinding webs of material.

Certain classes of paper manufacture, such as paper toweling or the like, require transverse weakening lines or perforations and require further thereafter to be rewound into hard or tight coils in order to get the maximum of paper within a given diameter of roll, and to make a neat and compact roll. We have found, if a center rewinding device is utilized to rewind material having weakening lines transversely thereof, that in order to wind the coil tightly an undue amount of stress has to be exerted by the rewinding shaft, and this force acting directly against the weakening lines in the web will have a tendency to cause a transverse severance of the web along said weakening lines.

We have found that the paper may be rewound into tight or hard coils by means of pressure rolls acting against the surface of the coil to be rewound, without exerting an undue stress upon the weakening lines of the material.

Accordingly one feature of the invention resides in a machine combining a means for producing transverse weakening lines in a web of material, together with means for rewinding the web into coil form consisting of a rotatable rewinding shaft and a plurality of rollers engaging the surface of the rewound coil under pressure to prevent undue pulling stress sufficient to sever the web transversely along the weakening lines.

When the web of material is not only weakened transversely at different intervals but also slitted lengthwise before being rewound, we find that relatively narrow web sections having weakening lines are more readily severed along those weakening lines by overpulling than when a relatively wide web of paper having transverse weakening lines is being rewound.

Another feature of the invention is to provide means for slitting and rewinding the web in such a way that the sections will have substantially the same power to resist being torn as a relatively wide web having weakening lines.

The invention further consists in a machine in which there are provided means for severing the web lengthwise into sections with a scalloped cut, together with means for rewinding the sections in coil form with the scalloped edges in interlocked relation but without interweaving.

Slitting the web with a scalloped or undulating cut and maintaining the scalloped edges of adjacent web sections interlocked without distorting the edges out of the plane of severance without interweaving, seems to diminish to but a very slight degree the power of resistance to longitudinal stresses possessed by the unslitted web.

Another advantage flows from the scalloped slitting of the web, in that a considerable saving of material is effected since the width of the web section so slitted will be measured from the peak of the scallop, and since the peaks of adjacent scalloped edges interlock, it is clear that there is in effect a saving of the width of the scalloped edge, one-half of the distance being saved on each side of the web section.

The invention is disclosed in a concrete and preferred form in the accompanying drawings, from which embodiment, however, changes may be made without departing from the scope of the invention.

In the said drawings:

Figure 1 is a side elevation of a portion of a perforating, slitting and rewinding machine, with parts in section, embodying the invention.

Fig. 2 is a vertical sectional view of the parts shown in Fig. 1, taken substantially on the line 2—2 of Fig. 3.

Fig. 3 is a plan view, with parts in section, of the device shown in Figs. 1 and 2.

Fig. 4 is a detail edge view of one of the slitting members.

Similar characters of reference indicate corresponding parts in the different views.

Figure 6:
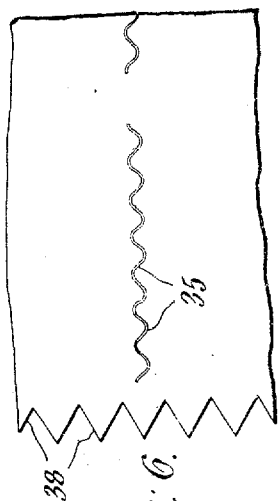
Figs. 5, 6, 7 and 8 are views showing the product made by the machine.

The web 1 is led from the mill roll 2 over the guide roller 6 and thence between the perforating members 4 and 5, after which it ...es in a straight path between the backing roller 6 and the slitting members 7, and thence to the rewinding shaft 8 where the material is rewound between the rollers 6, 9 and 10.

The guide roller 3 is mounted on an arm 11 which is pivoted at 12 and provided at its upper end with a cam member 13 pivoted at 14 and provided with a handle extension 15. This cam member acts against a spring-actuated plunger 16 seated in the socket 17' and normally urged toward the cam member 13 by the spring 18' which is adjustable by means of the nuts 19'. When the handle 15 is moved upwardly from the position shown in Figs. 1 and 2, the cam member 13 will be turned and the curved portion thereof will be brought against the spring-actuated plunger 16. This will swing the arm 11 around the pivot 12 and move the roller 3 away from the perforating member 4. When the handle 15 is moved downwardly into the position shown in Figs. 1 and 2 the roller 3 is moved up into engagement with the perforating member 4 and is held in locked position and under spring tension by reason of the engagement of the spring-actuated engaging plunger 16 with the cam member 13.

The perforating member 4 has a cylinder having longitudinal notches or grooves 17 for the reception of the perforating knives 18² suitably mounted on the perforating member 5.

The rewinding device comprises the backing roller 6, the rewinding roller 9 and the pressure roller 10, together with the rewinding shaft 8. This rewinding shaft 8 is rotatable but not driven positively by any instrumentality. The ends of this rewinding shaft 8 project into the guides 18 which are formed on the members 19 sliding in suitable guides, not shown, in the framework of the machine. Carried by the members 19 is further the pressure roller 10. It will be understood that the arrangement is double, there being a member 19 on each side of the machine. These two members 19 may be made to move in unison by having rack portions 20 at their lower ends engaging with pinions 21, one on each side of the machine, mounted on the common shaft 22. If desired the pressure roller 10 or the members 19 may be weighted so as to increase the pressure under which the coil 23 is being rewound.

Preferably the surface of the backing roller 6 is glass-hardened and is sufficiently harder than the slitting guides 7 so as to prevent the latter from cutting into the surface of the said backing roller.

Motion may be imparted to the elements in any suitable way and, as here shown, the main drive is through the shaft 24 of the backing roller 6. This backing roller drives the rewinding roller 9 in the same direction by means of an intermediate pinion 25. Further, by means of the sprocket 26, chain 27 and sprocket 28 motion is imparted to the shaft 29 of the perforating member 5. The shaft 29 in turn imparts motion to the members 4 and 3 by means of the chain of gears 30, 31 and 32.

One of the slitting members is shown in Fig. 4, from which it will be seen that it is provided with a scalloped or undulating cutting edge 33.

Figure 7:
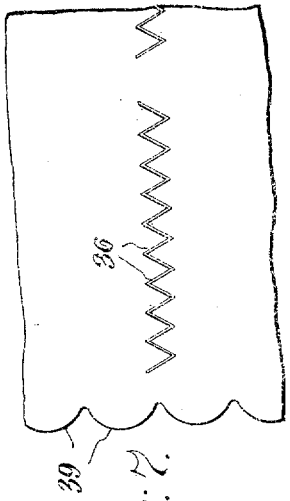
Figure 8:
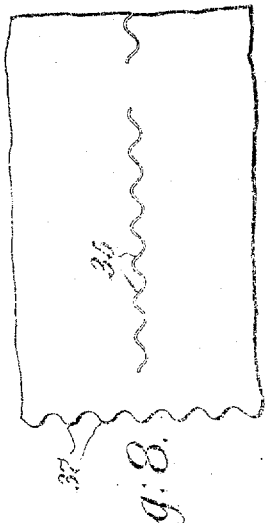
Figure 5:
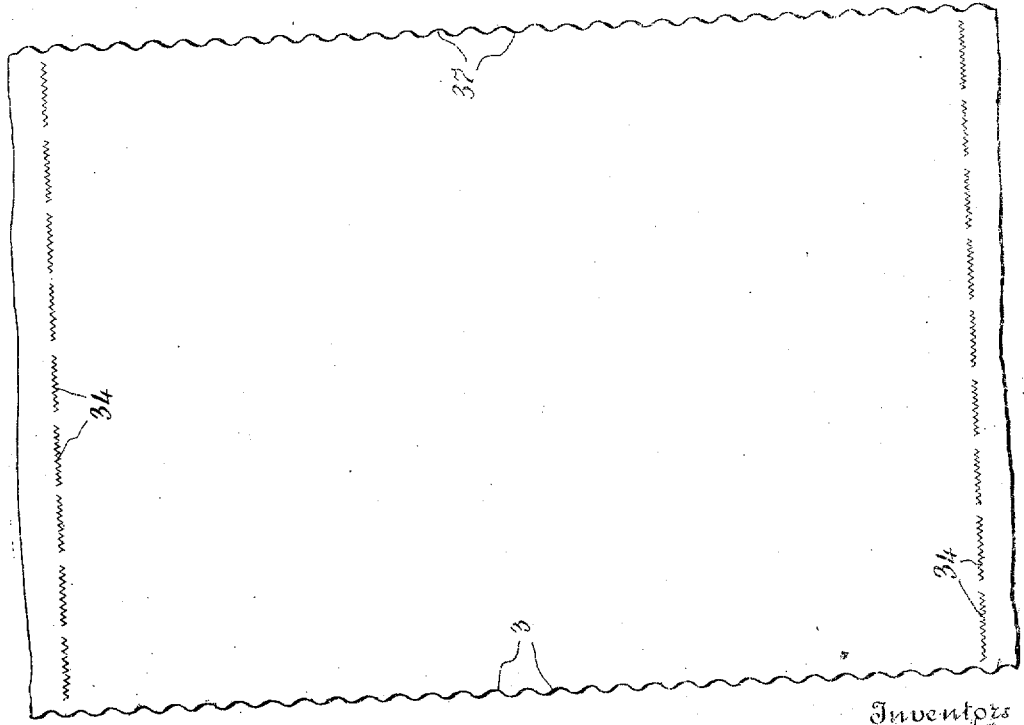

The paper in passing between the perforating members is given the transverse perforations 34, such as are shown in Fig. 5. Or if the contours of the perforating elements are different, they may be given perforations of the form shown at 35 in Figs. 6 and 8, or at 36 in Fig. 7. After being perforated the paper now passes between the backing roller 6 and the slitting member 7. The slitting members 7 slit the web longitudinally with an undulating cut so as to provide scalloped side edges in the web sections, such as are shown at 37 in Fig. 5. Or if the contour of the slitting members be different, such scalloped edges may be of the character shown at 38 in Fig. 6, or at 39 in Fig. 7. As seen from Fig. 3, the scalloped edges of adjacent web sections remain in interlocked relation, thereby retaining substantially the full resisting power of the unslitted web. The paper in passing between the backing roller 6 and the slitting members 7 is slit without being distorted out of the plane of severance, and the paper lies flat against the member 6 and passes around to the rewinding shaft 8. Here the combined pressure of the rollers 6, 9 and 10, the latter being preferably also driven by suitable means well understood in the art, will serve to rewind the material tightly into compact or hard coils and this without exerting an undue stress or overpulling on the web itself. By this means the tearing of the webs along the weakening lines is prevented. Also, while the scalloped edges of adjacent web sections are rewound into interlocked relation, there is no interweaving of adjacent coils, and after the rewinding operation is finished the coils can be readily separated.

The opposite ends of the pressure roller 10 are kept parallel by means of the racks 20 and pinions 21, fixed to a common shaft 22 so that all the coils rewound are of the same diameter whereby one web section, if several such are being rewound side by side, will not exert any greater pull at the point of severance than any other web section.

What is claimed, is:

1. A slitting and rewinding machine comprising: means for severing a web lengthwise into sections with a scalloped cut, and means for rewinding the sections into coil form with the scalloped edges in interlocked relation without interweaving.

2. A slitting and rewinding machine comprising: means for forming weakening lines transversely of a web, means for severing the web lengthwise into sections with a scalloped cut, and means for rewinding the sections into coil form with the scalloped edges in interlocked relation without interweaving.

3. A slitting and rewinding machine comprising: means for severing a web lengthwise into sections with a scalloped cut, and means for rewinding the sections into coil form with the scalloped edges in interlocked relation without interweaving, said means consisting of a rewinding shaft on which the web sections are rewound and a rewinding roller engaging the surface of the rewound coils.

4. A slitting and rewinding machine comprising: cutting means including a member having a tortuous cutting edge for severing a web lengthwise into sections with a scalloped cut, means for rewinding the sections into coil form with the scalloped edges in interlocked relation without interweaving, and means for guiding the web in a straight path through the cutting means.

Signed at Brooklyn New York in the county of Kings and State of New York this 31st day of July A. D. 1915.

JAMES A. CAMERON.
GUSTAF BIRGER BIRCH.

Witnesses:
JOHN L. C. MAYER,
EDWIN S. KNUDSON.